US009880968B2

(12) United States Patent
Burnette

(10) Patent No.: US 9,880,968 B2
(45) Date of Patent: Jan. 30, 2018

(54) BI-DIRECTIONAL COMMUNICATION BETWEEN ELECTRONIC COMPONENTS

(71) Applicant: Walter Kidde Portable Equipment Inc., Mebane, NC (US)

(72) Inventor: Stanley D. Burnette, Colorado Springs, CO (US)

(73) Assignee: WALTER KIDDE PORTABLE EQUIPMENT INC., Mebane, NC (US)

( * ) Notice: Subject to any disclaimer, the term of this patent is extended or adjusted under 35 U.S.C. 154(b) by 383 days.

(21) Appl. No.: 14/600,531

(22) Filed: Jan. 20, 2015

(65) Prior Publication Data
US 2015/0205753 A1 Jul. 23, 2015

Related U.S. Application Data

(60) Provisional application No. 61/929,662, filed on Jan. 21, 2014.

(51) Int. Cl.
*G06F 13/14* (2006.01)
*G06F 13/42* (2006.01)

(52) U.S. Cl.
CPC .......... *G06F 13/4286* (2013.01); *G06F 13/14* (2013.01); *G06F 13/4291* (2013.01)

(58) Field of Classification Search
CPC . G06F 13/14; G06F 1/20; G06F 13/24; G06F 13/36; G06F 13/38; G06F 13/40; G06F 13/42; G06F 13/4265; G06F 13/4273; G06F 13/4282; G06F 13/4286; G06F 13/4291; G06F 13/42913
See application file for complete search history.

(56) References Cited

U.S. PATENT DOCUMENTS

| | | | |
|---|---|---|---|
| 5,606,242 A * | 2/1997 | Hull | H02J 7/0004 320/106 |
| 5,734,844 A * | 3/1998 | Moughanni | G06F 13/24 710/105 |
| 5,826,068 A * | 10/1998 | Gates | G06F 13/4295 370/278 |
| 6,542,584 B1 * | 4/2003 | Sherwood | H04M 3/533 379/211.01 |
| 6,791,997 B2 | 9/2004 | Beyer et al. | |
| 6,816,544 B1 * | 11/2004 | Bailey | H04L 29/06 375/222 |
| 7,002,910 B2 | 2/2006 | Garcia-Luna-Aceves et al. | |
| 7,050,452 B2 | 5/2006 | Sugar et al. | |
| 7,395,362 B2 * | 7/2008 | Drexler | G06F 13/4295 710/110 |
| 7,522,552 B2 | 4/2009 | Fein et al. | |
| 7,734,809 B2 | 6/2010 | Joshi et al. | |
| 7,859,405 B2 | 12/2010 | Tang et al. | |
| 7,974,348 B2 | 7/2011 | Wang et al. | |
| 8,150,955 B2 | 4/2012 | Busch et al. | |

(Continued)

FOREIGN PATENT DOCUMENTS

GB          2390275 A     12/2003

*Primary Examiner* — Thomas J Cleary
(74) *Attorney, Agent, or Firm* — Cantor Colburn LLP

(57) ABSTRACT

Embodiments are directed to a system comprising: a first device, and a second device coupled to the first device via an interface that provides a handshaking algorithm that ensures that only one of the first device and the second device initiates communication over the interface at a given point in time.

16 Claims, 6 Drawing Sheets

(56) References Cited

U.S. PATENT DOCUMENTS

| | | |
|---|---|---|
| 8,432,786 B2 | 4/2013 | Li et al. |
| 2002/0087857 A1* | 7/2002 | Tsao .................... G06F 21/32 713/155 |
| 2003/0097248 A1* | 5/2003 | Terashima ....... G01R 31/31831 703/28 |
| 2006/0140147 A1 | 6/2006 | Van Bemmel |
| 2008/0002735 A1 | 1/2008 | Poirier et al. |
| 2009/0015382 A1 | 1/2009 | Greefkes |
| 2010/0087220 A1 | 4/2010 | Zheng et al. |
| 2010/0162053 A1* | 6/2010 | Gillingham ............ G06F 11/10 714/49 |
| 2010/0329227 A1 | 12/2010 | Argyriou |
| 2011/0153900 A1* | 6/2011 | Zitlaw .................. G06F 13/161 710/313 |
| 2011/0276735 A1* | 11/2011 | Cho .................... G06F 13/4022 710/110 |
| 2013/0163576 A1 | 6/2013 | Wang et al. |
| 2017/0116150 A1* | 4/2017 | Wiley ................ G06F 13/4282 |

\* cited by examiner

BI-DIRECTIONAL COMMUNICATION BETWEEN ELECTRONIC COMPONENTS

CROSS-REFERENCE TO RELATED APPLICATIONS

This application claims the benefit of U.S. provisional patent application Ser. No. 61/929,662, filed Jan. 21, 2014, the entire contents of which are incorporated herein by reference.

BACKGROUND

When two electronic components need to share information or data, they must communicate electrically with a common protocol in order to ensure that the information can be interpreted. If the communication is one-way, then a first device transmits the information and a second device receives the information. If bi-directional communication is used, either of the first or second devices can initiate the communication. In bi-directional communications, there must be a mechanism in place to determine if the communication channel is clear and if the recipient device (e.g., the second device) is ready to accept the communication.

Current two-wire communication schemes include RS232, Serial Peripheral Interface Bus (SPI), and Inter-Integrated Circuit ($I^2C$). RS232 is prone to collisions. SPI is typically implemented as a one-way communication scheme, wherein a first device serves as a master and a second device serves as a slave; the slave cannot initiate communication as the clock is supplied by the master. $I^2C$ communication is implemented as a one-way communication with a master and one or more slaves. Some low cost microcontrollers do not contain dedicated peripherals that can communicate using these protocols.

BRIEF SUMMARY

An embodiment is directed to a method for providing bi-directional communication capability between a first device and a second device, comprising: determining, by the first device, that a first signal line is in a deasserted state; based on the first device determining that the first signal line is in the deasserted state, driving, by the first device, the first signal line to an asserted state; subsequent to the first device driving the first signal line to the asserted state, ceasing the driving of the first signal line by the first device; subsequent to the first device ceasing the driving of the first signal line, determining, by the first device, that the first signal line is in the asserted state; and based on the first device determining that the first signal line is in the asserted state, initiating a transfer of data from the first device to the second device.

An embodiment is directed to an apparatus comprising: at least one processor, and memory having instructions stored thereon that, when executed by the at least one processor, cause the apparatus to: determine that a first signal line coupled to the apparatus is in a deasserted state; based on determining that the first signal line is in the deasserted state, drive the first signal line to an asserted state; subsequent to driving the first signal line to the asserted state, cease the driving of the first signal line; subsequent to ceasing the driving of the first signal line, determine that the first signal line is in the asserted state; and based on determining that the first signal line is in the asserted state, initiate a transfer of data from the apparatus.

An embodiment is directed to a system comprising: a first device, and a second device coupled to the first device via an interface that provides a handshaking algorithm that ensures that only one of the first device and the second device initiates communication over the interface at a given point in time.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
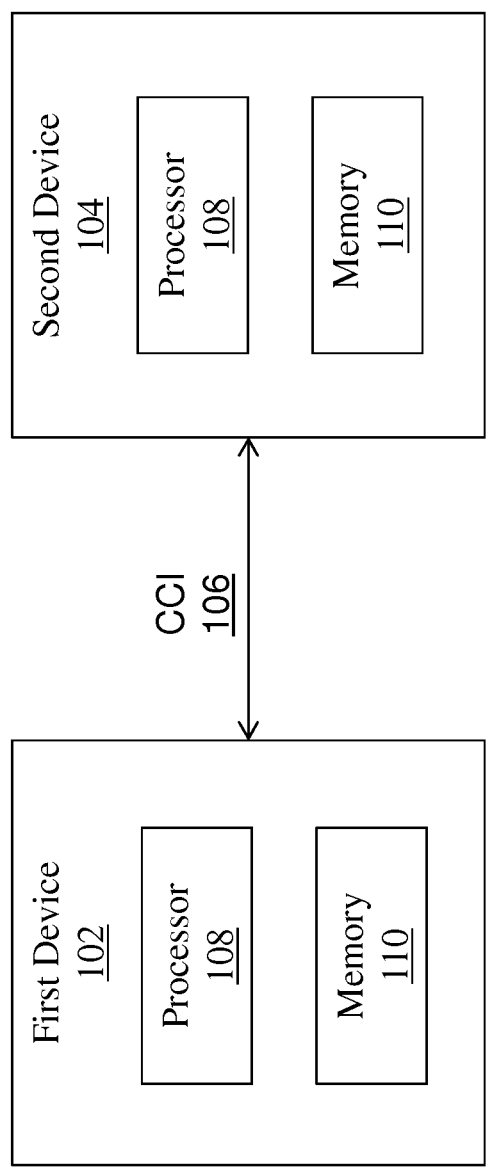
FIG. 1 is a block diagram of an exemplary communication system environment.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Referring to FIG. 1, exemplary embodiments of apparatuses, systems, and methods are described for providing a common interface between a first device 102 and a second device 104. In some embodiments, the first device 102 may be an alarm or other detection device. In some embodiments, the second device 104 may be a communication module or communication device, and may be operative in connection with one or more communication protocols or standards. In some embodiments, the second device 104 may transmit a status of the first device 102 to, e.g., one other more other devices (not shown). In some embodiments, the second device 104 may transmit the status of other devices (e.g., other alarms) to the first device 102.

As shown in FIG. 1, a common communication interface (CCI) 106 may connect or couple the first device 102 and the second device 104. The CCI 106 may serve as a communication channel between the first device 102 and the second device 104. The CCI 106 may support a bi-directional interface and may include a handshaking scheme or algorithm to make sure that only one end of the interface communicates at a time, thereby providing for collision avoidance. For example, in some embodiments a bi-directional interface may provide a handshaking algorithm that ensures that only one of the first device 102 and the second device 104 initiates communication over the interface at a given point in time. In a first time instance (e.g., a first data transfer operation), the first device 102 may supply a clock signal, and in a second time instance (e.g., a second data transfer operation), the second device 104 may supply the clock signal. A minimum amount of resources, such as input/output (I/O) resources, memory, and awake time, may be used in connection with the interface 106.

In some embodiments, one or both of the devices 102 and 104 may each include one or more processors 108 and memory 110 have instructions stored thereon that, when executed by the processor(s) 108, cause the devices 102 or 104 to perform one or more acts as described herein.

Figure 2:
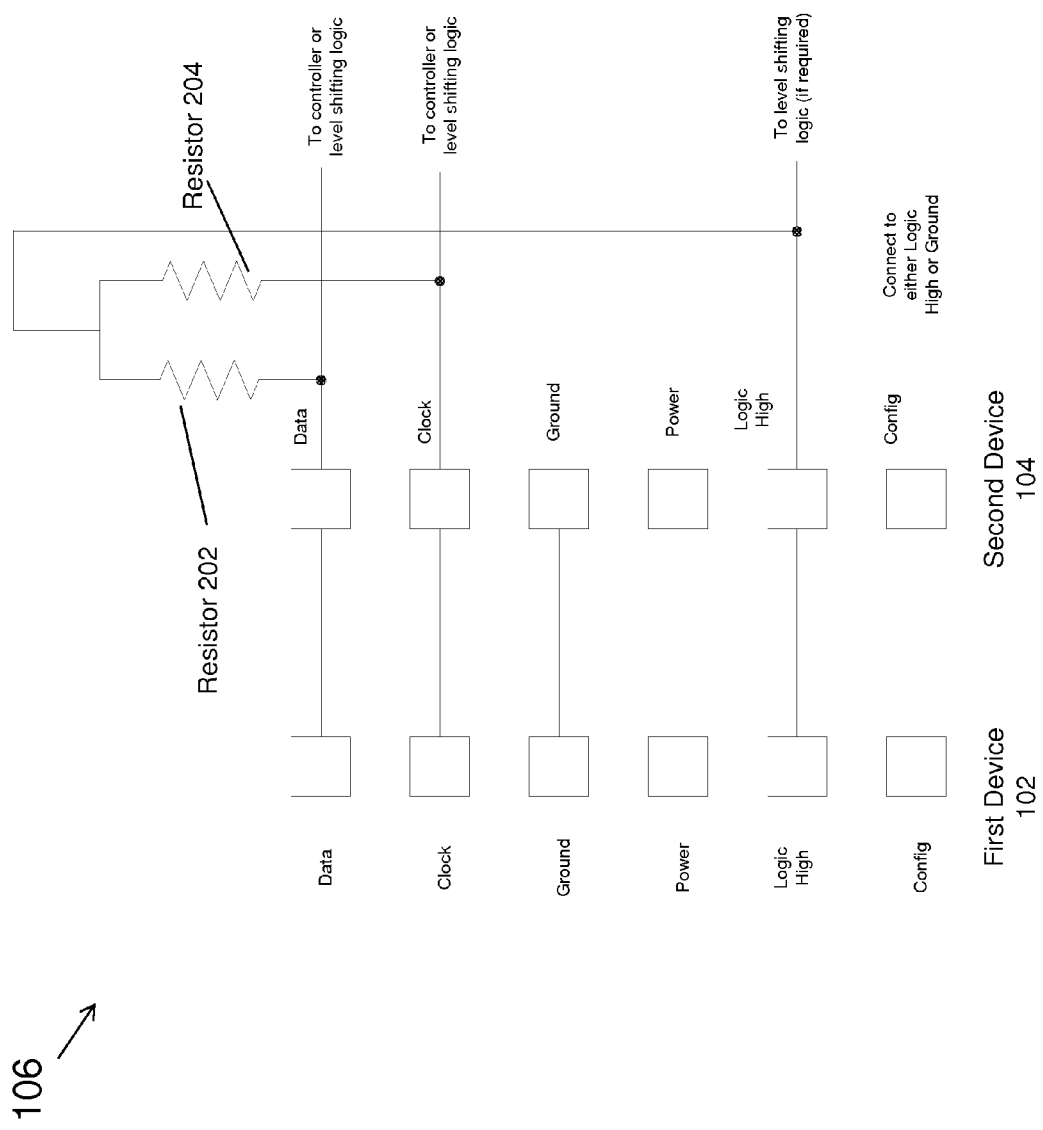
FIG. 2 is a diagram of an exemplary communication interface.

Referring to FIG. 2, the CCI 106 is shown in greater detail. Specifically, FIG. 2 shows the pins associated with the first device 102 and the second device 104 for a plurality of signal lines. In some embodiments, the pins may be associated with a connector with a 2×4 header on 0.100" centers. The role and functionality of the pins/lines is shown and described further below in connection with Table 1.

TABLE 1

Pins/Lines Associated With CCI

| Pin Number | Name | Direction | Description |
|---|---|---|---|
| 1 | Data | Bi-directional | Data for three-wire communication interface or transmit(TX) for two-wire interface |
| 2 | Clock | Bi-directional | Clock for three-wire communication interface or receive(RX) for two-wire interface |
| 3 | Ground | Bi-directional | — |
| 4 | Power | To Second Device 104 | Provided if the second device 104 needs external power |
| 5 | Logic High | To Second Device 104 | Provides a voltage level to the second device 104 to reference any needed level shifters |
| 6 | Config | From Second Device 104 | Specifies the type of (hardware) communication interface to be used |

The "logic high" pin/line may correspond to a voltage supplied to the second device 104 in order for the second device 104 to know what logic voltage level to use. It can be used by the second device 104 to supply level shifting circuits (not shown). It may be the responsibility of the second device 104 to match the logic levels of the first device 102. In this way, any added cost burden due to level shifting electronics may be placed in the second device 104, rather than the first device 102 which may be manufactured or produced at higher volumes.

The "power" pin/line may be used to supply power to the second device 104 if needed. If the second device 104 is self-powered the "power" pin/line may be unused.

The "ground" pin/line may be used to establish a common ground or reference between the devices 102 and 104.

The "config" pin/line may be used by the second device 104 to inform the first device 102 what type of communication interface the second device 104 uses. Possible options are RS232 or a proprietary two-wire interface. In some embodiments, the "config" pin/line may be hardwired, but the "config" pin/line could be changed during operations to facilitate a change in communication interface "on the fly." Once the first device 102 determines the type of communication interface to use by reading the state of the "config" pin/line, the first device 102 may configure the "data" and "clock" pins/lines for the proper functionality and begin initialization. Use of a single "config" pin/line may provide for a binary selection of communication interface types. More nuanced, detailed, or varied selections may be made by, e.g., including additional "config" pins/lines.

The "data" pin/line may serve multiple functions. The behavior of the "data" pin/line may change depending on the type of communication interface selected by "config." In clocked schemes, the "data" pin/line may serve as data. In two-wire serial scheme, the "data" pin/line may serve a transmit (TX) function. For the two-wire scheme, the "data" pin/line may be pulled up by a resistor 202 to "logic high."

The "clock" pin/line may serve multiple functions. The behavior of the "clock" pin/line may change depending on the type of communication interface selected by "config." In clocked schemes, the "clock" pin/line may serve as a clock. In two-wire serial scheme, the "clock" pin/line may serve a receive (RX) function. For the two-wire scheme, the "clock" pin/line may be pulled up by a resistor 204 to "logic high."

The values for the resistors 202 and 204 may be selected based on one or more criteria. For example, in some embodiments the values may be selected to ensure an adequate noise margin, to distinguish between logic levels or states or to enable higher communication speeds. In some embodiments, one or both of the resistors 202 and 204 may be equal to 1K ohm.

The pins/lines shown and described above are not exhaustive. In some embodiments, additional pins or lines may be provided. For example, in some embodiments one or more spares may be provided for future use or expansion capabilities. In some embodiments, a "busy" pin/line may be used as a chip select in clocked schemes (and may be unused in serial schemes).

For the two-wire communication interface/scheme, data may be sent in a clocked manner with data valid on the rising edge of the "clock" pin. The data packet may include two bytes or sixteen bits, with the most significant bit sent first. Bits 15-8 may be referred to as a command byte, and bits 7-0 may be referred to as a data byte. Any number of bits/bytes may be sent after the handshaking sequence has been successfully completed.

Before any data can be clocked, an initialization sequence may need to be performed that establishes which of the first device 102 and the second device 104 is the sender of the data and which of the first device 102 and the second device 104 is the recipient of the data.

Figure 3A:
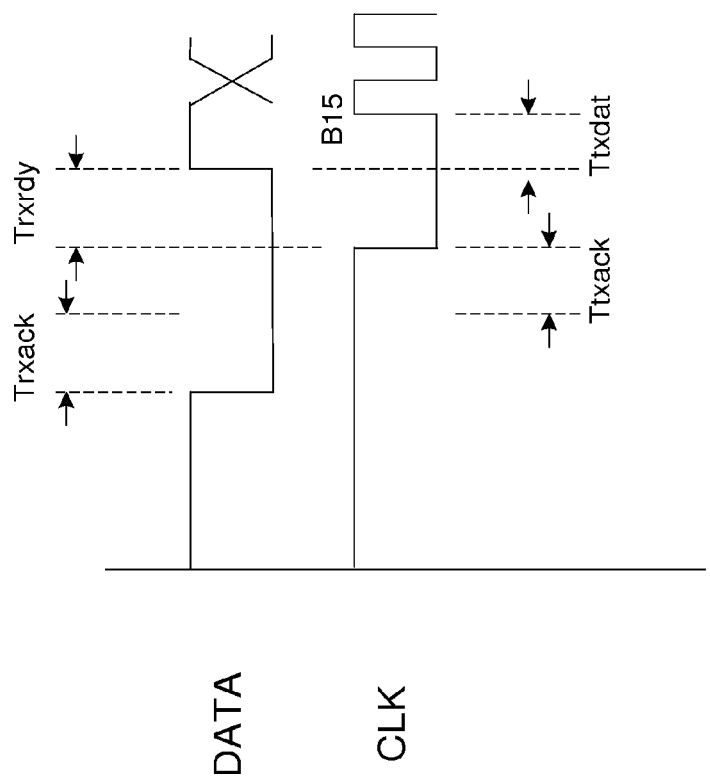
FIG. 3A is a timing diagram for a part of the communication interface of FIG. 2.
Figure 3B:
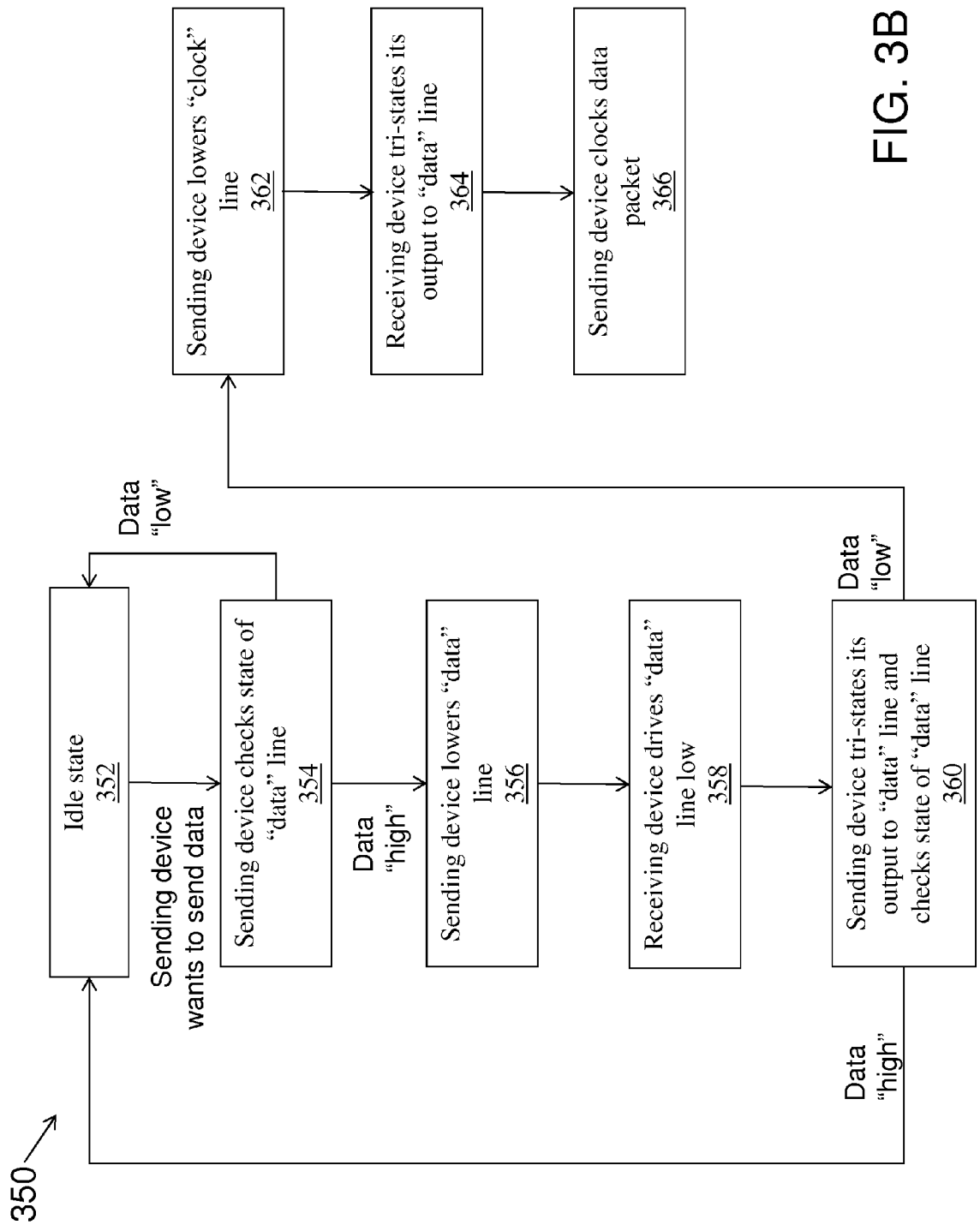
FIG. 3B is a flow chart of an exemplary method.

Referring to FIGS. 3A-3B, a timing diagram 300 and a method 350 are shown, respectively. When in an idle state (block 352), both devices 102 and 104 may have their "clock" and "data" pins in a high impedance ("high-Z" or "tri-stated") condition. As the "clock" and "data" lines are pulled up to "logic high" via the resistors 204 and 202, respectively, both "clock" and "data" lines will be high in the idle state, or more generally, in a deasserted state.

When one of the devices 102 and 104 (e.g., device 102 or more generally a sending device) wants to send a packet of data to the other of devices 102 and 104 (e.g., device 104 or more generally a receiving device), flow may proceed from block 352 to block 354.

In block 354, the sending device may check the state of the "data" line. If the "data" line is high, the sending device may know that the receiving device is ready to start the initialization process, and flow may proceed from block 354 to block 356. If the "data" line is low that may mean the receiving device wants to transmit data; from the perspective of the sending device, flow may proceed from block 354 to block 352, which may correspond to aborting or suspending the transmission of the data packet by the sending device.

In block 356, the sending device may lower or assert the "data" line to start initialization. Flow may proceed from block 356 to block 358.

In block 358, in response to sensing the "data" line being taken low (by the sending device), the receiving device may, in turn, turn-on its output to the "data" line and drive or assert the "data" line low. Flow may proceed from block 358 to 360.

In block 360, after a time Trxack, the sending device may cease driving or deassert the "data" line and check the logic level of the "data" line. If the check shows that the "data" line is low or asserted, that may mean that the receiving device acknowledged the data transfer request (e.g., block 358 executed successfully) and flow may proceed from block 360 to block 362. If the check shows that the "data" line is high or deasserted, the receiving device may have failed to provide an acknowledgment (e.g., block 358 did not execute successfully); the data packet transmission may be aborted and flow may proceed from block 360 to block 352.

In block 362, the sending device may drive or assert the "clock" line low within a time Ttxack. Flow may proceed from block 362 to block 364.

In block 364, the receiving device may detect the "clock" line is low (as a result of the sending device driving it low) and cease driving or deassert the "data" line by tri-stating its output to the "data" line within a time Trxrdy. As a result, the "data" line is pulled-up by the resistor 202. Flow may proceed from block 364 to block 366.

In block 366, the sending device may detect the "data" line high and begin clocking the data packet. The first clock signal might not occur until after a time Ttxdat has elapsed in order to provide the receiving device time to setup to receive the data packet.

The method 350 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 3B.

In terms of the timing parameters Trxack, Ttxack, Trxrdy, and Ttxdat shown and described above in connection with FIGS. 3A-3B, Table 2 below provides more information regarding the minimum/maximum times (in terms of microseconds) that may be associated with the parameters in a particular embodiment. Of course, the values are illustrative and are subject to change in any given implementation.

TABLE 2

Timing Parameters

| Timing Parameter | Maximum | Minimum | Description |
|---|---|---|---|
| Trxack | — | 50 | Minimum time sending device provides receiving device to acknowledge "data" line being sent low |
| Ttxack | 50 | — | Maximum time sending device takes to drive "clock" line low after receiver acknowledges data transfer request |
| Trxrdy | 50 | — | Maximum time receiving device takes to tri-state its output to "data" line following "clock" line low |
| Ttxdata | — | 10 | Minimum time sending device provides receiving device to setup to receive data packet following receiving device tri-stating "data" line |

Figure 4:
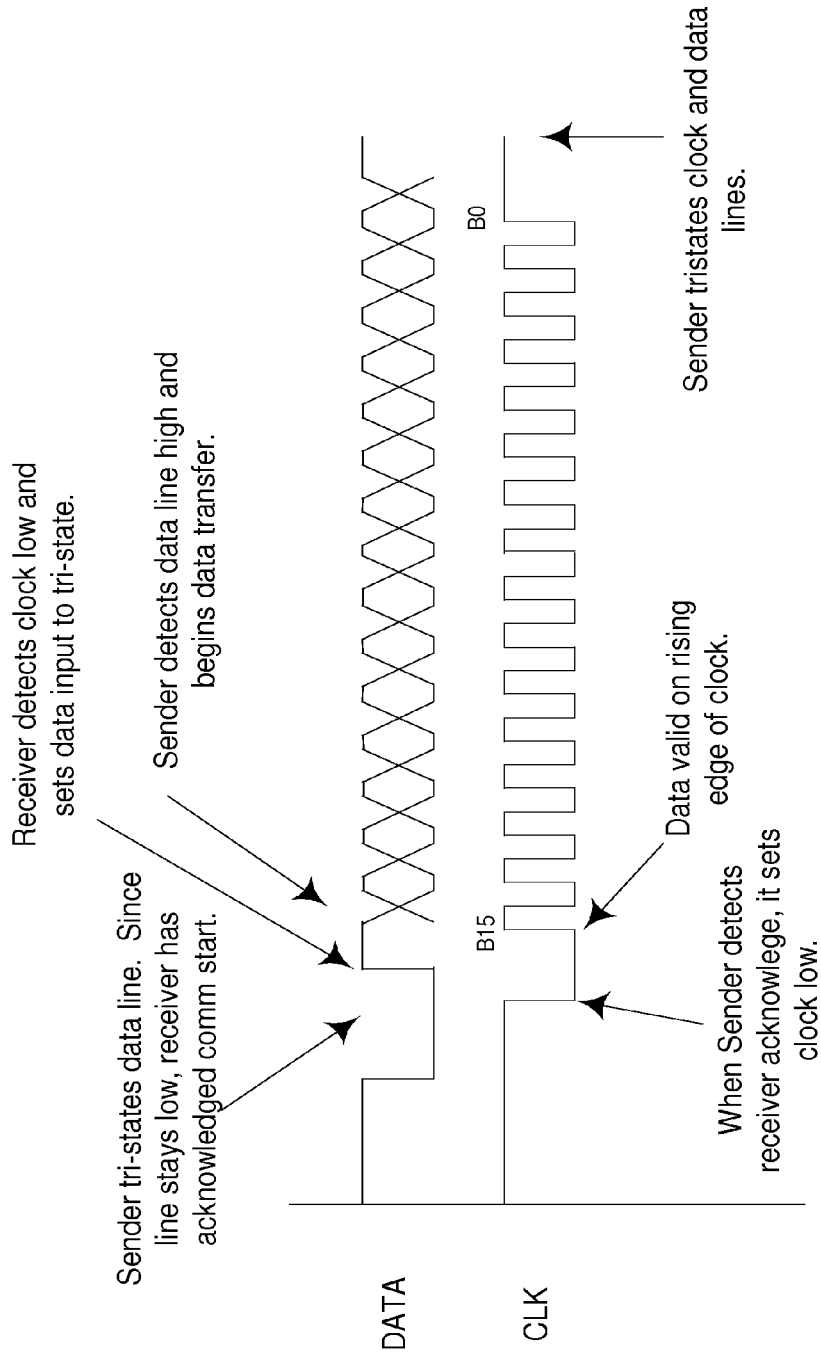
FIG. 4 is a diagram illustrating a successful initialization and data transfer.

Referring to FIG. 4, a complete transmission of a data packet from sending device to receiving device is shown. As shown, the data packet may be transmitted from most significant bit (bit number 15 (B15)) to least significant bit (bit number 0 (B0)). The data may be valid on a particular edge of the "clock" (CLK) line, such as the rising edge of the clock. Once the data packet has been transmitted, the sending device may tri-state its output to the "clock" and "data" lines, which may cause those lines to go high as a result of pull-up resistors 204 and 202, respectively.

Figure 5:
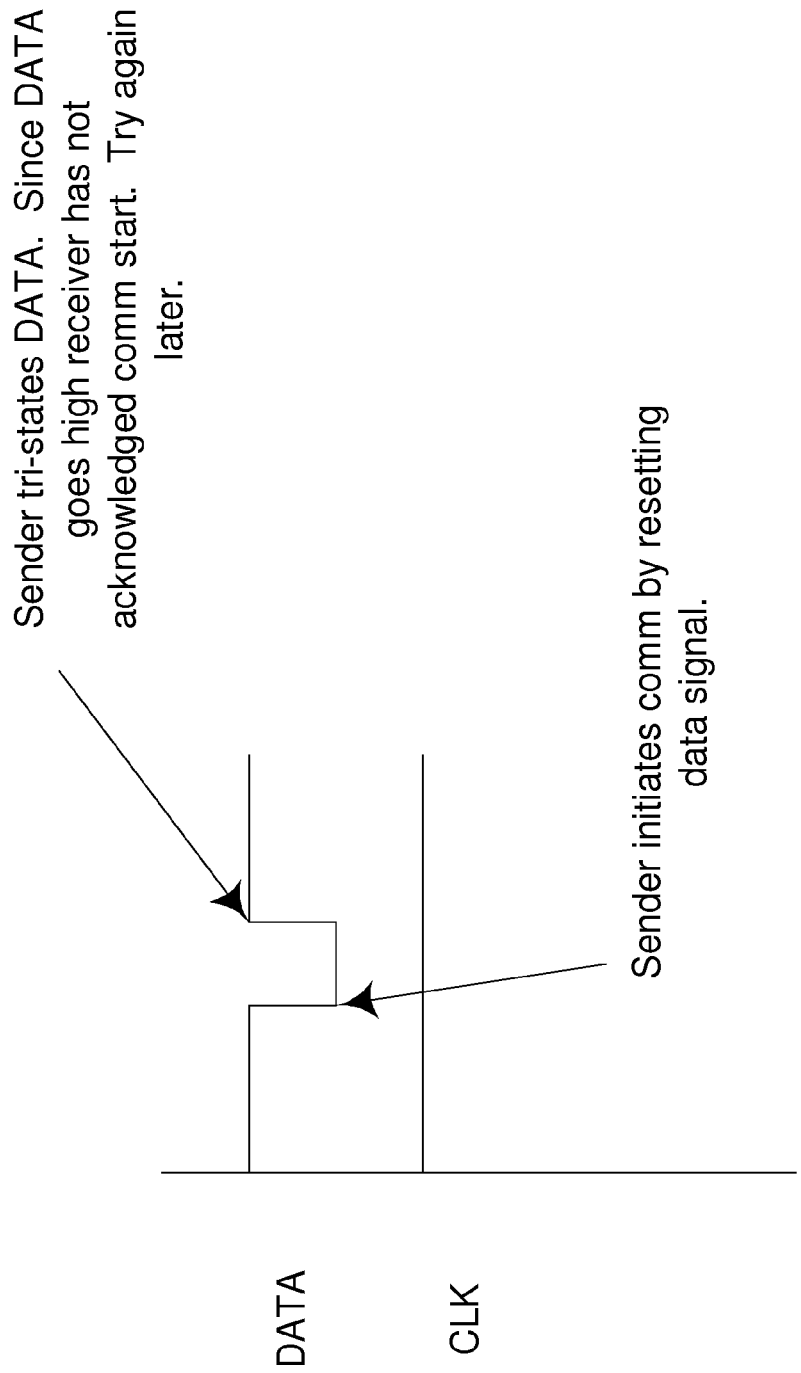
FIG. 5 is a diagram illustrating a failed initialization.

Referring to FIG. 5, a failed initialization attempt is shown. For example, the transition of the "data" line high may correspond to a failure of block 358 to execute successfully.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for providing bi-directional communication capability between a first device and a second device, comprising:

determining, by the first device, that a first signal line is in a deasserted state;

based on the first device determining that the first signal line is in the deasserted state, driving, by the first device, the first signal line to an asserted state;

subsequent to the first device driving the first signal line to the asserted state, ceasing the driving of the first signal line by the first device;

subsequent to the first device ceasing the driving of the first signal line, determining, by the first device, that the first signal line is in the asserted state; and based on the first device determining that the first signal line is in the asserted state, initiating a transfer of data from the first device to the second device, wherein initiating the transfer of data from the first device to the second device comprising:

driving, by the first device, a second signal line to an asserted state;

subsequent to the first device driving the second signal line to the asserted state, determining, by the first device, that the first signal line is in the deasserted state a second time; and based on the first device determining that the first signal line is in the deasserted state the second time, transmitting the data from the first device.

2. The method of claim 1, wherein the first signal line is a data line and the second signal line is a clock line.

3. The method of claim 2, wherein the data is valid on a rising edge of the clock line.

4. The method of claim 1, wherein the first signal line is pulled up to a logic high level in the deasserted state.

5. The method of claim 1, further comprising:
subsequent to transferring the data from the first device to the second device, determining, by the first device, that the first signal line is in the asserted state a second time;
based on the first device determining that the first signal line is in the asserted state the second time, driving, by the first device, the first signal line to the asserted state a second time;
subsequent to the first device driving the first signal line to the asserted state the second time, determining, by the first device, that a second signal line is in an asserted state;
based on first device determining that the second signal line is in the asserted state, ceasing the driving of the first signal line by the first device; and
preparing, by the first device, to receive second data.

6. The method of claim 1, wherein the first device comprises an alarm detection device, and wherein the data pertains to a detected alarm condition.

7. The method of claim 1, wherein the data comprises at least one data packet, and wherein the at least one data packet comprises a command byte and a data byte.

8. An apparatus comprising:
at least one processor; and
memory having instructions stored thereon that, when executed by the at least one processor, cause the apparatus to:
determine that a first signal line coupled to the apparatus is in a deasserted state;
based on determining that the first signal line is in the deasserted state, drive the first signal line to an asserted state;
subsequent to driving the first signal line to the asserted state, cease the driving of the first signal line;
subsequent to ceasing the driving of the first signal line, determine that the first signal line is in the asserted state; and
based on determining that the first signal line is in the asserted state, initiate a transfer of data from the apparatus; and
transfer the data by:
driving a second signal line coupled to the apparatus to an asserted state;
subsequent to driving the second signal line to the asserted state, determining that the first signal line is in the deasserted state a second time; and
based on determining that the first signal line is in the deasserted state the second time, transmitting the data from the apparatus.

9. The apparatus of claim 8, wherein the first signal line is a data line and the second signal line is a clock line.

10. The apparatus of claim 9, wherein the data is valid on a rising edge of the clock line.

11. The apparatus of claim 8, wherein the instructions, when executed by the at least one processor, cause the apparatus to:
subsequent to transferring the data, determine that the first signal line is in the asserted state a second time;
based on determining that the first signal line is in the asserted state the second time, drive the first signal line to the asserted state a second time;
subsequent to driving the first signal line to the asserted state the second time, determine that a second signal line coupled to the apparatus is in an asserted state;
based on determining that the second signal line is in the asserted state, cease the driving of the first signal line by the first device; and
prepare to receive second data.

12. The apparatus of claim 11, wherein the instructions, when executed by the at least one processor, cause the apparatus to:
receive the second data over the first signal line,
wherein the second data pertains to an alarm condition detected by a second apparatus.

13. The apparatus of claim 8, wherein the apparatus comprises an alarm detection device, and wherein the data pertains to a detected alarm condition.

14. A system comprising:
a first device; and
a second device coupled to the first device via an interface that provides a handshaking algorithm that ensures that only one of the first device and the second device initiates communication over the interface at a given point in time.

15. The system of claim 14, wherein the interface coupling the first device and the second device comprises:
a configuration signal line configured to indicate to the first device a type of communications interface the second device uses;
a first signal line configured to function as a bi-directional data signal line when the configuration signal line is in a first state and function as a transmit signal line for the first device when the configuration signal line is in a second state; and
a second signal line configured to function as a clock signal line when the configuration signal line is in the first state and function as a receive signal line for the first device when the configuration signal line is in the second state.

16. The system of claim 15, wherein the interface coupling the first device and the second device comprises:
a ground signal line configured to establish a common ground between the first device and the second device;
a power signal line configured to provide power from the first device to the second device; and
a logic signal line configured to provide a voltage level from the first device to the second device to enable the second device to match logic levels of the first device.

* * * * *